July 31, 1945.  J. HIRMANN  2,380,525
FILAMENTARY CATHODE AND METHOD OF MANUFACTURE
Original Filed Feb. 24, 1943

INVENTOR
Julius Hirmann
BY
Charles McClain
ATTORNEY

Patented July 31, 1945

2,380,525

UNITED STATES PATENT OFFICE 2,380,525

FILAMENTARY CATHODE AND METHOD OF MANUFACTURE

Julius Hirmann, Hillside, N. J., assignor to Radio Corporation of America, a corporation of Delaware Original application February 24, 1943, Serial No. 476,906. Divided and this application January 5, 1944, Serial No. 517,291

6 Claims. (Cl. 29—25.17)

My invention relates to cathodes, particularly to cathodes of the filamentary type for use in radio tubes and the like, and to methods for making such cathodes.

This application is a division of my application for "Cathodes," Serial No. 476,906, filed February 24, 1943.

Filaments of the type used in radio tubes and the like are lengths of fine wire welded at their ends to relatively heavy lead-in conductors. To prevent excessive breakage, it has been found necessary to affix to the ends of each filament light metal tabs which in turn are attached by welding to the conductors. Because of the smallness and fragility of the filament wire it is not practical to weld the wire to the side of a single rectangular piece of sheet metal. Apparently the welding heat necessary to weld a fine wire, such as tungsten, to a nickel tab of nickel embrittles the wire in the weld region so that a slight tension on the wire will break it.

The principal object of my invention is an improved tabbed filamentary cathode.

Another object of my invention is an improved method of attaching metal tabs to filamentary cathodes.

My improved filamentary cathode comprises a wire with two sheet metal pieces on opposite sides of the wire, the two pieces being welded together and to the wire. The weld region, however, terminates short of or inwardly from the edge of the metal pieces from which the wire extends. The unwelded edge portion of the metal pieces flares outwardly and away from the wire so as to provide a slightly tapered funnel or ferrule for supporting the wire adjacent its point of attachment to the metal pieces.

The novel method of fabricating my improved tabbed cathode comprises blanking windows between the sides of and uniformly spaced along two metal ribbons, which are superimposed one on the other with the windows in registry. Filament wire is fed between the ribbons so that the wire lies substantially midway between the edges of the ribbons and lengthwise of the windows. The sandwiched wire and ribbons are fed between welding electrodes, which weld together the contacting portions of the ribbons and wires. Finally the portions of the ribbons along the side of the windows are cut away, leaving a completed filament with attached tabs.

Figure 4:
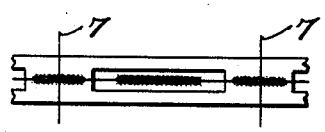
Figure 5:
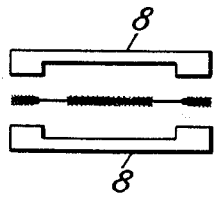
Figure 6:

The characteristic features of my invention are defined in the appended claims and the preferred embodiment of my new tabbed cathode is described in the following specification and shown in the accompanying drawing in which Figures 1, 2, 3, 4 and 5 show, respectively, metal ribbon and wire during the successive steps involved in making my improved cathode, Figure 5 showing the finished tabbed cathode and two pieces of waste ribbon, and Figure 6 is an enlarged longitudinal sectional view of the weld region of my novel tab and cathode.

Figure 1:
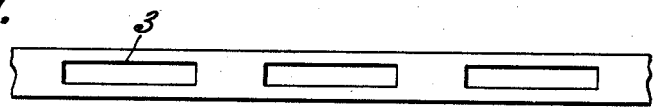
Figure 2:
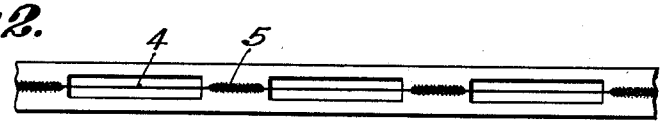
Figure 3:

Two metal ribbons preferably of sheet nickel, and each of the type shown in Figure 1, are cut or blanked out to provide a plurality of uniformly spaced windows 3 between the edges of the ribbon. The two ribbons are then superimposed one on the other with the filament wire 4 between the two ribbons and substantially midway between the edges of the ribbons so that the wire extends lengthwise of the windows. The ribbons and the interposed wire are welded together in a weld indicated at 5, Figure 2, to secure the wire and the two ribbons together and make a cathode strip long enough to provide a large number of cathodes. While the filament wire is thus framed in the windows, the wire may, if an oxide coated cathode is desired, be coated with electron emissive material 6, such as barium and strontium carbonates. Thereafter the individual cathodes are obtained by cutting the strip transversely along lines 7, preferably through the weld 5 and midway between the ends of the windows as shown in Figure 4, and then cutting away both side rails 8 of the window frame adjacent the weld region as shown in Figure 5, leaving the finished tabbed cathode of Figure 6.

A machine for performing the operations suggested in Figures 1 to 6 is shown by way of example in my application Serial No. 476,906, of which this application is a division. Blanked out ribbons of the type shown in Figure 1 superimposed with the windows of the two ribbons in exact registry are fed lengthwise and held apart enough to permit the filament to be fed lengthwise of the ribbons and to a position midway between the sides of the ribbons. The two ribbons pass through spaced channels in guide blocks which keep them superimposed and separated to permit the filament wire to feed through an intermediate channel into place between the ribbons and thence between welding electrodes, preferably of the roller type. The welding electrodes are so made and the weld timing mechanism is so adjusted that welding starts and stops short of the ends of the windows so that the weld 5 is shorter than the distance between the adjacent ends of the windows and a small amount of unwelded ribbon surrounds the wire at the points where the wire emerges from the ribbon at the ends of the windows. Since the wire is mechanically protected between the attached metal ribbons it is conveniently handled and processed without danger of injury to the wire. The welded wire and ribbon cathode strip may be wound directly on reels, as it leaves the welding electrodes, and stored for future use.

Good results have been obtained in sandwiching a tungsten-molybdenum filament wire .0005 inch (one-half of one thousandths of an inch) in diameter between two nickel ribbons, each .001 inch thick and .125 inch wide with windows about .062 inch wide and .50 inch long, and with .250 inch spaces between the windows. Tabs .125 inch long and about .010 inch wide may be attached to both ends of the filament wire although the .0005 inch wire is so fine it may be broken with a strong draft of air.

One outstanding advantage of my new tabbed filament is that the wire will not break at or near the weld region, even if the wire in the tab be somewhat embrittled by the weld heat. When wire of a metal as refractory as tungsten or tungsten-molybdenum alloy is pressed by welding electrodes against soft sheet metal, such as nickel, the welding current melts only the nickel, and the wire is pushed into the surface of the nickel. The embedded portion of the wire hence is sharply bent and strained and apparently contributes to the tendency of the wire to break. However, when two pieces of nickel are pressed against opposite side of the wire and welded, as taught by my invention, there is no tendency for the wire to bend near the nickel. Further, when the weld region terminates at a point removed from the edges of the two nickel pieces, so that the weld region terminates short of or inward from the end edges of the windows, the unwelded edge portions of the nickel ribbon flare slightly to provide a funnel or ferrule slightly tapered away from the wire. Hence, ductile wire unaffected by the weld heat extends into and between the two nickel pieces. No bending force can be applied to the wire at the weld region and the wire can be broken only by direct pull.

My novel tabbed filaments display no tendency to break at or near the tabs and no special care need be observed in welding the tabs to heavy wires or lead-in conductors.

What I claim as new is:

1. The method of fabricating filaments for radio tubes and the like comprising blanking windows between the sides of, and uniformly spaced lengthwise along, two metal ribbons, superimposing one ribbon on the other with the windows in registry and feeding a filament wire between the ribbons so that the wire lies substantially midway between the edges of the ribbons and lengthwise of the windows, feeding the ribbons and wire between welding electrodes, welding together the contacting portions of the ribbons and wire, and finally cutting away the portions of the ribbons along the sides of the windows.

2. The method of attaching tabs to the ends of a wire filament comprising cutting a window in each of two metal ribbons, superimposing one ribbon on the other with the windows in registry, supporting a wire filament between the two ribbons with the wire extending across the window, welding together the contacting portions of the ribbons and wire, and finally removing the portions of the ribbons on either side of the window.

3. The method of tabbing wire filaments comprising cutting out windows between the sides of, and uniformly spaced and lengthwise along two metal ribbons, laying the wire filament along the center of one ribbon and laying the second ribbon on the first ribbon over the wire with the windows in registry, welding together the superimposed portions of the ribbon along their lines of contact with the wire and finally cutting away the portions of the ribbons not welded together.

4. The method of fabricating filaments for radio tubes and the like comprising cutting windows between the sides of and uniformly spaced lengthwise along two metal ribbons, drawing the two ribbons through channels in guide blocks to accurately superimpose one ribbon on the other, and drawing the filament wire through the channel of another guide block between the first two mentioned channels to guide the wire into position between the two ribbons and along the center of the ribbons, welding the ribbons and wire together at spaced points and finally removing the unwelded portions of the ribbons.

5. The method of fabricating tabbed filaments comprising blanking windows between the sides of and uniformly spaced lengthwise along two metal ribbons, superimposing one ribbon on the other with the windows in registry and feeding a filament wire between the ribbons so that the wire lies substantially midway between the edges of the ribbons and lengthwise of the windows, welding together the contacting portions of the ribbons and wire, cutting in two the ribbons intermediate the ends of adjacent windows and cutting away the portions of the ribbons along the sides of the windows.

6. The method of fabricating tabbed filamentary cathodes for radio tubes and the like comprising blanking uniformly spaced windows in two metal ribbons, superimposing one ribbon on the other with the wire between the ribbons and extending lengthwise of said wires, joining contacting portions of the ribbon and wire, coating the exposed portions of the wire in the windows with electron emissive material, and finally removing the portions of the ribbons along the sides of the windows.

JULIUS HIRMANN.